United States Patent [19]

Kullmann et al.

[11] Patent Number: 5,649,749
[45] Date of Patent: Jul. 22, 1997

[54] BRAKE SYSTEM FAULT MODE GENERATOR

[75] Inventors: Bernhard W. Kullmann, Rochester Hills; Joerg Scheibel, Auburn Hills; Toki Nestorovski, Clinton Township, all of Mich.

[73] Assignee: ITT Automotive Electrical Systems, Inc., Auburn Hills, Mich.

[21] Appl. No.: 473,469

[22] Filed: Jun. 7, 1995

Related U.S. Application Data

[63] Continuation-in-part of Ser. No. 334,310, Nov. 4, 1994, abandoned.

[51] Int. Cl.[6] ................................................. B60T 8/88
[52] U.S. Cl. ...................... 303/122.04; 303/122.01; 303/122.08
[58] Field of Search .................. 303/122.01, 122.08, 303/122.03, 122.04, 122.05, 122.1

[56] References Cited

U.S. PATENT DOCUMENTS

| | | | |
|---|---|---|---|
| 3,767,272 | 10/1973 | Leiber | 303/122.01 |
| 4,320,506 | 3/1982 | Farazi et al. | 303/122.08 |
| 4,389,710 | 6/1983 | Rasmussen | 303/122.08 |
| 4,802,710 | 2/1989 | Burgdorf et al. | 303/122.08 |
| 4,837,552 | 6/1989 | Vandemotter et al. | 303/122.08 |
| 5,225,805 | 7/1993 | Cage et al. | 303/122.01 |

Primary Examiner—Matthew C. Graham
Attorney, Agent, or Firm—Thomas N. Twomey; J. Gordon Lewis

[57] ABSTRACT

A fault controller for a brake system includes a control display having a plurality of identifying labels displayed thereon corresponding to predetermined brake system fault mode options. A plurality of switches corresponding to the identifying labels and selectively setable to activate and deactivate conditions are on the control display. Fluid control valves are disposed along brake lines between the master cylinder and the wheel brakes. There are electrical connections between the switches and fluid control valves wherein setting one of the switches to the activate condition activates a corresponding fault mode of the brake system. An enable switch on the controller, if included, must be set to an "enable" condition for the fault controller to affect brake operation.

1 Claim, 2 Drawing Sheets

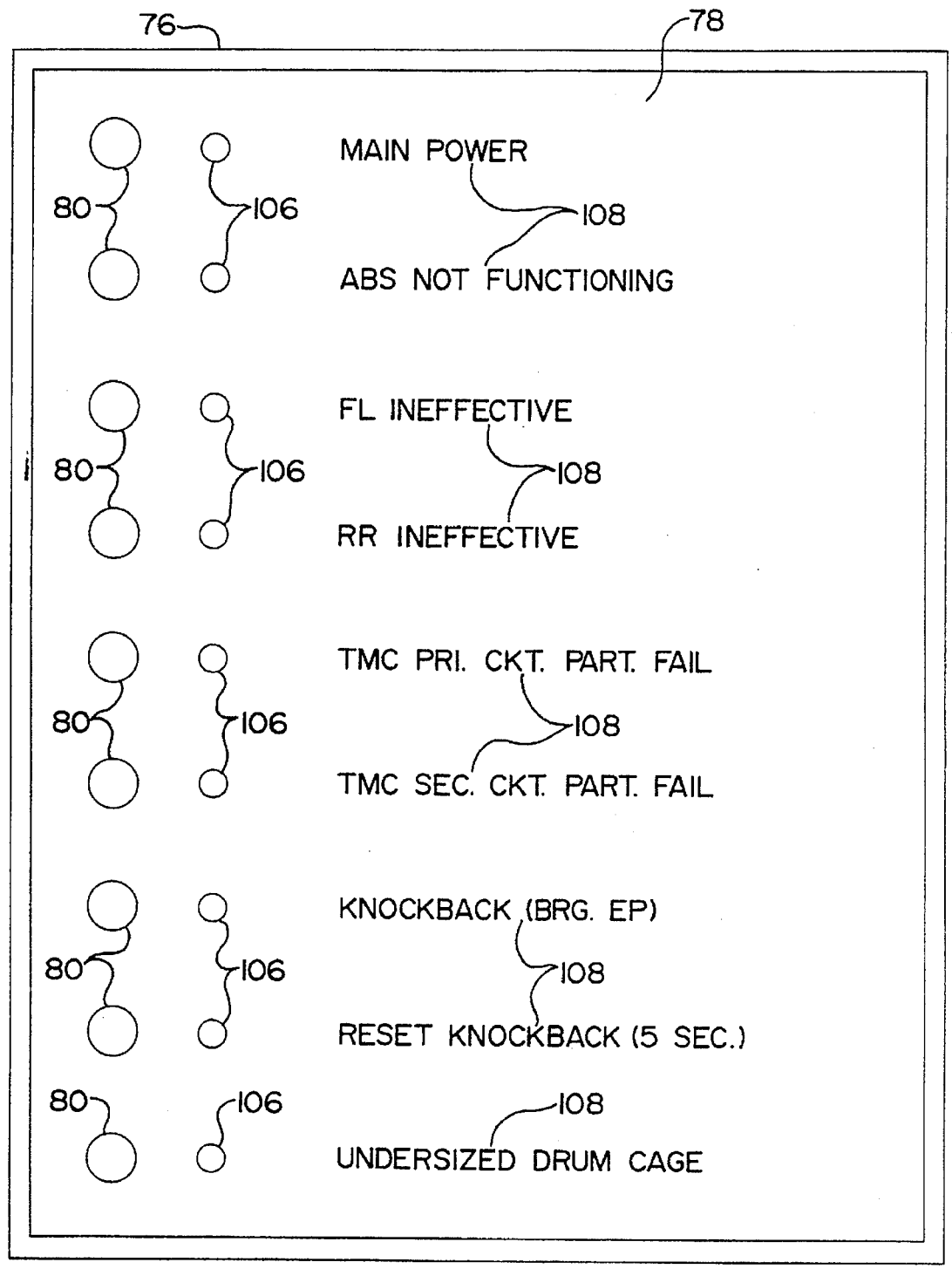

BRAKE SYSTEM FAULT MODE GENERATOR

This application is a continuation-in-part of U.S. Ser. No. 08/334,310, filed Nov. 4, 1994 abandoned.

FIELD OF THE INVENTION

This invention is directed to the field of brake systems, and more specifically to test and development equipment for use with brake systems.

BACKGROUND ART

Modern brake systems, and particularly anti-lock brake systems, are highly sophisticated electro-mechanical control devices employed in motor vehicles. There is a need for engineers and technicians developing brake systems to understand all of the potential fault modes of the systems and the resultant effect on vehicle handling. Even engineers and technicians with a solid conceptual understanding of brake systems do not necessarily have an intuitive understanding of the effect experienced by a vehicle operator when one or more of the elements in the system does not function as expected.

It is desired to provide a device allowing the simulation of various fault conditions of brake systems, including anti-lock brake systems. Such faults include: a totally ineffective front brake, a totally ineffective rear brake, a leak in the master cylinder primary circuit, a leak in the master cylinder secondary circuit, excessive bearing end play, and undersized drum cage.

SUMMARY OF THE INVENTION

A fault controller for a brake system is disclosed comprising a control display having a plurality of identifying labels displayed thereon corresponding to predetermined brake system fault options. A plurality of switches, corresponding to the identifying labels and selectively setable to activate and deactivate conditions, are on the control display. Fluid control valves are disposed along brake lines between the master cylinder and the wheel brakes. There are electrical connections between the switches and fluid control valves wherein setting one of the switches to the activate condition activates a corresponding fault mode of the brake system. An enable switch on the controller, if included, must be set to an "enable" condition for the fault controller to affect brake operation.

Also disclosed is a brake system comprising a master cylinder selectively pressureized by a vehicle operator to apply vehicle wheel brakes. Brake lines extend between the master cylinder and the vehicle wheel brakes. A fault controller of the brake system is connected to an electrical power source and has a plurlaity of output terminals connecting with the fluid control valves, and a plurality of switches disposed between the electrical power source and the oputput terminals.

The present invention discloses a device for selectively simulating certain fault modes within a brake system which is useful for the development of brake systems and the training of engineers and technicians working with both conventional hydraulic and anti-lock brake systems.

BRIEF DESCRIPTION OF THE DRAWINGS

FIG. 2 is a schematic diagram of a representative control display of the present invention.

DETAILED DESCRIPTION OF THE PREFERRED EMBODIMENTS

Figure 1:
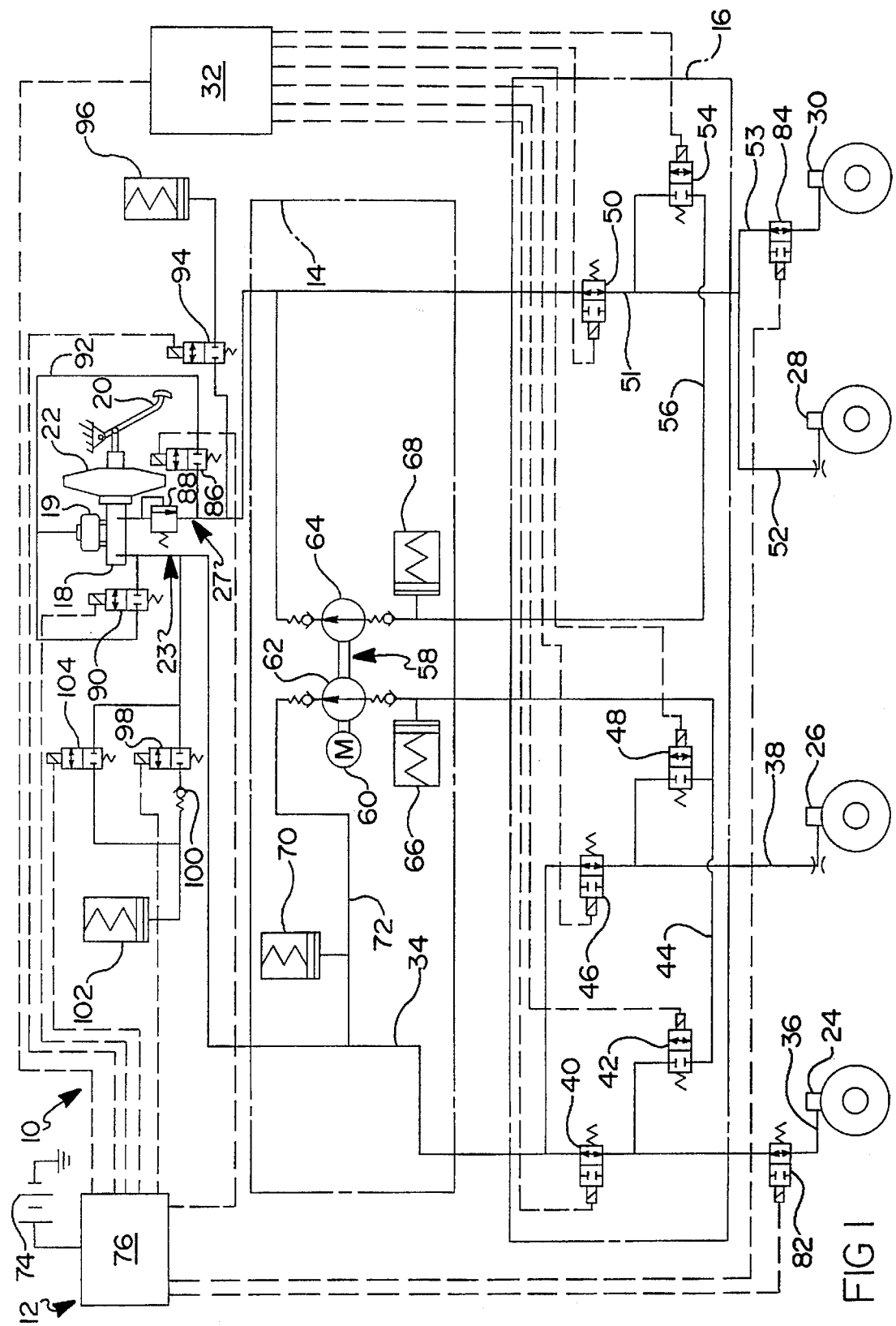
FIG. 1 is a schematic of a hydraulic power circuit for a vehicle brake system equipped with an anti-lock brake control system and a fault mode generator.

FIG. 1 shows a vehicle brake system configured for anti-lock operation, or an anti-lock brake system. The anti-lock brake system 10 is supplemented by a fault mode generator 12 used to simulate brake system fault modes. The anti-lock brake system 10 includes both components common to conventional hydraulically actuated service brake systems and anti-lock components. Two main anti-lock brake subsystems are the motor pump assembly 14 and the valve block 16.

The service brake system components include a tandem master cylinder 18 operated by a vehicle operator (not shown) selectively depressing a brake pedal 20. A reservoir 19 connected to master cylinder 18 is a source of brake fluid for the service brakes. A power booster 22 uses vacuum from the engine intake manifold (not shown) to pneumatically assist the operator applied pedal force in actuating the service brake. Hydraulic lines connect a forward portion of the tandem master cylinder 18 with a primary hydraulic circuit 23, including wheel brakes at the left and right front corners, 24 and 26 respectively. Hydraulic lines connect a rearward portion of tandem master cylinder 18 with a secondary hydraulic circuit 27 including wheel brakes at the left and right rear corners, 28 and 30 respectively. Alternatively, the primary and secondary circuits could provide a diagonally split hydraulic system instead of the front-to-rear split described above.

Anti-lock components include, besides motor pump assembly 14 and valve block 16, an electronic control unit (ECU) 32 electrically connected to both.

The valve block 16 has a plurality of hydraulic fluid control valves located along the hydraulic lines connecting tandem master cylinder 18 with wheel brakes 24, 26, 28 and 30. A front pressure line 34 of primary hydraulic circuit 23 splits into left and right front pressure lines 36 and 38 respectively within block 16. A normally open left front inlet valve 40 is located on left front pressure line 36, operably disposed between tandem master cylinder 18 and the left front wheel brake 24. A normally closed left front exhaust valve 42 is teed-off left front pressure line 36 between front left inlet valve 40 and wheel brake 24, connecting to a front return line 44. A normally open right front inlet valve 46 is located on right front pressure line 38, operably disposed between tandem master cylinder 18 and front right brake 26. A normally closed right front exhaust valve 48 is teed-off right front pressure line 38 between right front inlet valve 46 and right front wheel brake 26, connecting to return line 44.

A normally open rear inlet valve 50 of valve block 16 is disposed along a rear pressure line 51 of secondary hydraulic circuit 27 between tandem master cylinder 18 and rear wheel brakes 28 and 30. outside valve block 16, pressure line 51 splits between a left rear pressure line 52 connected to left rear wheel brake 28 and a right rear pressure line 53 connected to right rear wheel brake 30. A normally closed rear exhaust valve 54 of valve block 16 is teed-off rear pressure line 51 between inlet valve 50 and rear wheel brakes 28 and 30, and connects to a rear return line 56.

The return lines 44 and 56 feed into a motor pump assembly 58 having a motor 60 driving a first pumping unit 62 and a second pumping unit 64. First pumping unit 62 is connected on an inlet side with front return line 44. A first accumulator 66 of motor pump assembly 58 is teed-off the front return line 44. Second pumping unit 64 is connected on an inlet side with rear return line 56. A second accumulator 68 in motor pump assembly 58 is teed-off rear return line 56. A third accumulator 70 is teed-off an outlet line 72 from first pumping unit 62. Outlet line 72 from second pumping unit 64 connects with rear pressure line 51.

ECU 32 is electrically connected with motor 60, and inlet valves 40, 46 and 50 and exhaust valves 42, 48 and 54. ECU 32 is also connected to a power source such as a 12 volt battery 74. ECU 32 emits control signals along electrical conductors to inlet valves 40, 46, 50 and exhaust valves 42, 48, 54. ECU 32 also monitors a plurality of system parameters, such as wheel rotational velocity, and emits signals to the valves dependent upon those parameters.

Fault mode generator 12 substantially comprises a fault controller 76, best seen in FIG. 2, having a display panel 78 with a plurality of toggle switches 80, and seven electrically responsive fault control valves electrically connected with fault controller 76. Switches 80 are toggled between activate and deactivate positions. Fault controller 70 is electrically connected with a power source, such as 12 volt battery 74. Although seven fault control valves are in the embodiment shown, there could be more or fewer, depending on the type and number of fault modes to be simulated.

The first valve 82 is a normally open valve disposed in left front pressure line 36 between front left wheel brake 24 and front left exhaust valve 42. The second valve 84 is a normally open valve disposed in right rear pressure line 53.

The third valve 86 is a normally closed valve and is teed-off rear pressure line 51 between master cylinder 18 and valve 50. A proportioning valve 88 is disposed between master cylinder 18 and third valve 86. The fourth valve 90 is a normally closed valve and is teed-off front primary hydraulic circuit 23 between master cylinder 18 and motor pump assembly 14. A fluid return circuit 92 connects valves 86 and 90 and reservoir 19.

The fifth fault control valve 94 is a normally closed valve teed-off rear pressure line 51 between third valve 86 between valve 50 and valve 86. A first fault mode accumulator 96 hydraulically connected to fifth valve 94 is operably connected with pressure line 51 by valve 94 when valve 94 is open.

The sixth fault control valve 98 is a normally closed valve teed-off front primary hydraulic circuit 23 between valve 90 and pump assembly 14. A check valve 100 is disposed in series with valve 98 opposite hydraulic circuit 23, and is in turn connected to a second fault mode accumulator 102. Valve 100 permits flow from valve 98 to accumulator 102, and blocks flow in the opposite direction. The seventh fault control valve 104 is a normally closed valve disposed in parallel with valves 98 and 100.

Each of the plurality of toggle switches 80 of display panel 78 has an associated LED 106 adjacent thereto. Each LED is associated with one of the switches 80. The associated LED 106 is illuminated when a switch 80 is in an activate position. Each of switches 80 has an identifying label 108 adjacent to it. Each identifying label 108 is descriptive of the fault mode produced by toggling adjacent switch 80 to the activate position. There are nine individual toggle switches 80 on the display panel 78 which provide a total of seven separate fault modes. The switches 80 have the following identifying labels 108: MAIN POWER, ABS NOT FUNCTIONING, FL INEFFECTIVE, RR INNEFFECTIVE, TMC PRI. CIR. PART. FAIL, TMC SEC. CIR. PART. FALL, KNOCKBACK (BRG. EP), RESET KNOCKBACK (5 SEC.), and UNDERSIZED DRUM CAGE.

The invention operates in the following manner. Depression of brake pedal 20 by the vehicle operator causes fluid in tandem master cylinder 18 (TMC) to be pressurized. Power booster 22 aids in the pressurization of the fluid. When Main Power switch 80 is in an off position, and/or none of the fault modes are elected, and ECU 32 does not cause any of the anti-lock brake system valves 40, 42, 48, 50 or 54 to be activated, fluid in primary circuit 23 and secondary circuit 27 is pressurized, with pressure being communicated to all four wheel brakes 24, 26, 28 and 30.

If ECU 32 detects one of the left front, right front, or rear wheels rotating a a low rate of speed relative to the others, it will intermittently interrupt pressure to the slower wheel or wheels to prevent lock up by intermittently actuating the valves associated with that wheel. For example, to prevent rear wheel lock up, valves 50 and 54 are intermittently cycled, thereby alternately applying and releasing the rear brakes.

Fault mode generator 12 is used to duplicate the effect of a failure of one or more of the system components to operate as expected. The seven fault modes wheich can be generated with fault mode generator are described below. However, before any of the fault modes can be induced, the Main Power switch must be in an ON position. The illumination of Main Power LED 106 serves as a warning that any of the fault modes elected with switches 80 will be enabled or activated.

The switch 80 labeled "ABS NOT FUNCTIONING" induces a first fault mode in an activate position. The first fault mode is characterized by valves 40, 42, 46, 48, 51 and 54 of valve block 16 not being activated. When the "ABS NOT FUNCTIONING" switch is in the activate position, current flow to ECU 32 is interrupted, thereby disabling the anti-lock brake (ABS) feature.

The second fault mode, front left brake ineffective, is to simulate rotor thickness variation. With the switch labeled "FL INNEFFECTIVE" in the activate position, and the associated LED 106 illuminated, valve 82 closes, preventing application of brake 24. When brake pedal 20 is depressed, the vehicle will pull to the right.

The third fault mode, right rear brake ineffective, is to simulate an out-of-round brake drum. With the switch labeled "RR INNEFFECTIVE" in the activate position, and the associated LED 106 illuminated, valve 84 closes, preventing application of brake 30. When brake pedal 20 is depressed, the vehicle will pull to the left.

The fourth fault mode, tandem master cylinder (TMC) primary circuit failure, is to simulate a severe fluid leak in the primary circuit controlling the front brakes. With the switch labeled "TMC PRI. CKT. PART. FAIL" in the activate position, and the associated LED 106 illuminated, valve 90 opens, connecting primary circuit 23 with reservoir 19. When brake pedal 20 is depressed, stopping distance will be increased and pedal 20 will have a long, mushy stroke.

The fifth fault mode, tandem master cylinder secondary circuit failure simulates a severe fluid leak in the secondary circuit controlling the rear brakes. With the switch labeled "TMS PRI. CKT. PART. FAIL" in the activate position, valve 86 opens, connecting secondary circuit 27 with reservoir 19. As in the fourth fault mode, when the brake pedal 20 is depressed, stopping distance witll be increased and pedal stroke will be long and mushy.

The sixth fault mode, excessive bearing end play, or knockback, simulates excessive end play of a wheel bearing. With the switch labeled "KNOCKBACK (BRG. EP)" in the activate position, valve 98 opens, connecting primary circuit 23 with accumulator 102. Valve 100 prevents fluid from flowing from the accumulator to valve 98. When the pedal 20 is depressed, pedal travel is initially long, but with a couple of pumps of the pedal, it returns to normal. To discharge the accumulator at the end of this evaluation, the switch labeled "RESET KNOCKBACK (5 SEC)" is put in the activate position to open valve 104 for 5 seconds without applying the pedal while the "KNOCKBACK (BRG. EP)" switch is in the off, or deactivate position.

The seventh fault mode simulates an undersized drum cage. With the switch labeled "UNDERSIZED DRUM CAGE" in the activate position, valve 94 opens, connecting secondary circuit 27 with accumulator 96. When pedal 20 is depressed, the pedal is low with each apply, and stopping distance is increased. Pumping does not improve either pedal travel or firmness.

The fault mode activating switches here are provided by simple toggle switches 80 movable between open and closed position which can alternatively correspond to the activate and deactivate conditions. The switches can alternatively be provided by any known switching or relay device. Alternative display devices could be used as well. One example of an alternative display is a CRT screen. The CRT may be combined with an alternative to the toggle switches such as a touch screen for choosing the desired fault modes.

Although the fault mode generator 12 is shown here with an anti-lock brake system, it should be readily apparent that it could be alternatively employed with a conventional hydraulically actuated brake system.

The preceding detailed description of the invention is not intended as a limitation of the invention, but is merely one of many possible embodiments of the invention. The true scope of the invention can be best understood by studying the appended claims.

We claim:

1. A brake system comprising:

a master cylinder selectively pressurized by a vehicle operator:

a plurality of vehicle wheel brakes:

a plurality of electrically responsive fault control valves disposed in the brake lines;

a fault controller connected to an electrical power source and having a plurality of output terminals connected to the fault control valves, and a plurality of operator selectable switches disposed between the electrical power source and the output terminals;

a brake pedal connected with the master cylinder, the brake pedal selectively displaced a first stroke distance by the vehicle operator to pressurize the master cylinder and apply the brakes;

an accumulator and a normally closed fault control valve disposed between the accumulator and a front hydraulic circuit; and a check valve blocking flow to the fault control valve disposed between the accumulator and the fault control valve wherein when the normally closed fault control valve is activated, a second pedal stroke longer than the first pedal stroke is progressively shortened to the first pedal stroke with repeated pumping of a brake pedal to simulate excessive wheel bearing end play.

* * * * *